US012671985B2

(12) United States Patent
Huang et al.

(10) Patent No.: US 12,671,985 B2
(45) Date of Patent: Jun. 30, 2026

(54) ACCESS AND MOBILITY MANAGEMENT FUNCTION RELOCATION DUE TO SECURITY GATEWAY OVERLOAD/FAILURE

(71) Applicant: Verizon Patent and Licensing Inc., Basking Ridge, NJ (US)

(72) Inventors: Chien-Yuan Huang, Basking Ridge, NJ (US); Suzann Hua, Beverly Hills, CA (US); Helen Osias Eglip, Sammamish, WA (US); Parry Cornell Booker, Sunnyvale, TX (US)

(73) Assignee: Verizo n Patent and Lic ensing Inc., Basking Ridge, NJ (US)

( * ) Notice: Subject to any disclaimer, the term of this patent is extended or adjusted under 35 U.S.C. 154(b) by 673 days.

(21) Appl. No.: 17/818,412

(22) Filed: Aug. 9, 2022

(65) Prior Publication Data
US 2024/0056803 A1     Feb. 15, 2024

(51) Int. Cl.
*H04W 12/033* (2021.01)
*H04W 12/37* (2021.01)
*H04W 24/08* (2009.01)

(52) U.S. Cl.
CPC ......... *H04W 12/033* (2021.01); *H04W 12/37* (2021.01); *H04W 24/08* (2013.01)

(58) Field of Classification Search
CPC ... H04W 12/033; H04W 12/37; H04W 24/08; H04W 12/03
See application file for complete search history.

(56) References Cited

U.S. PATENT DOCUMENTS

| | | | | |
|---|---|---|---|---|
| 2017/0245311 A1* | 8/2017 | Murray | .............. | H04W 12/033 |
| 2018/0227699 A1* | 8/2018 | Kim | ...................... | H04W 60/02 |
| 2021/0144050 A1* | 5/2021 | Fagan | ..................... | H04L 45/28 |

OTHER PUBLICATIONS

C. Kaufman et al., "Internet Key Exchange Protocol Version 2 (IKEv2)", RFC 5996, Sep. 2010, pp. 1-138 (Year: 2010).*

* cited by examiner

*Primary Examiner* — Jeffrey D. Popham

(57) ABSTRACT

A device establishes a first encrypted tunnel with a first active security gateway at a first data center to enable the device to communicate, via the first encrypted tunnel, with a first access and mobility management function (AMF) at the first data center. The device forwards, via the first encrypted tunnel and the first active security gateway, a first User Equipment device (UE) message to the first AMF. The device determines an occurrence of a failure or overload condition at the first active security gateway, and establishes, based on the determined occurrence of the failure or over-load condition, a second encrypted tunnel with a standby security gateway at a second data center to enable the device to communicate, via the second encrypted tunnel, with the first AMF. The device forwards, via the second encrypted tunnel and the standby security gateway, at least one second UE message to the first AMF.

21 Claims, 10 Drawing Sheets

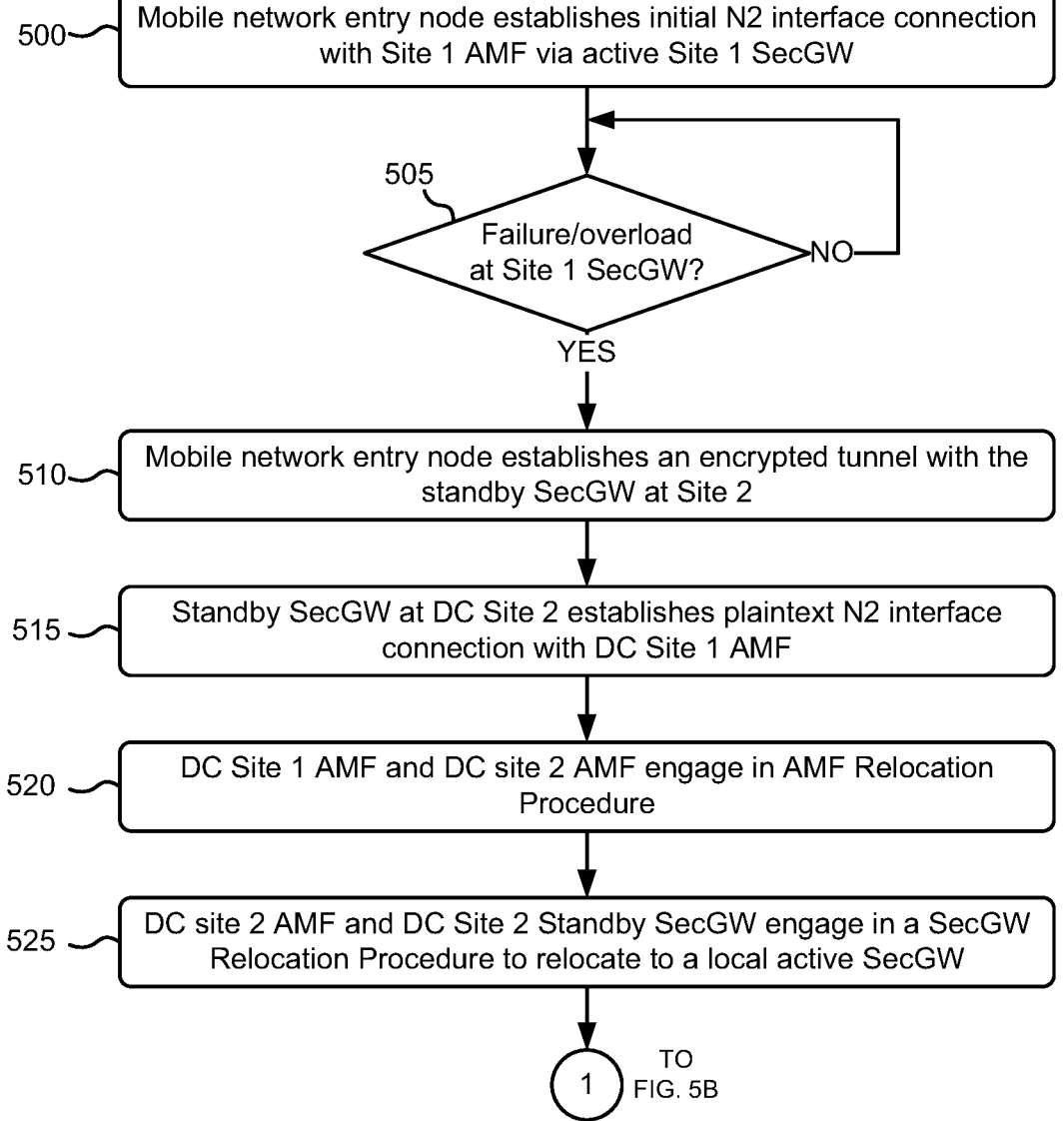

500 — Mobile network entry node establishes initial N2 interface connection with Site 1 AMF via active Site 1 SecGW

505

Failure/overload at Site 1 SecGW? — NO

YES

510 — Mobile network entry node establishes an encrypted tunnel with the standby SecGW at Site 2

515 — Standby SecGW at DC Site 2 establishes plaintext N2 interface connection with DC Site 1 AMF 520 — DC Site 1 AMF and DC site 2 AMF engage in AMF Relocation Procedure 525 — DC site 2 AMF and DC Site 2 Standby SecGW engage in a SecGW Relocation Procedure to relocate to a local active SecGW

ACCESS AND MOBILITY MANAGEMENT FUNCTION RELOCATION DUE TO SECURITY GATEWAY OVERLOAD/FAILURE

BACKGROUND

As networks move to a Software Defined Network (SDN) model, dedicated hardware devices/components that have traditionally implemented particular network functions are being replaced by virtual network functions (VNFs). VNFs include network functions that have been moved into software that runs on commodity hardware. VNFs may be executed as one or more virtual machines (VMs) on top of the hardware networking infrastructure. VNFs typically increase network scalability and agility, while enabling better use of network resources. VNFs additionally reduce power consumption and reduce the use of available physical space due to the VNFs replacing physical hardware. VNFs, thus, reduce operational and capital costs.

VNFs can be considered as building blocks and can be connected or combined together to provide multiple capabilities required to provide a networking communication service. For example, VNFs can be linked together in a process known as service chaining. Traditionally, new network services and functions have been installed manually and configured within dedicated hardware devices. VNFs, however, eliminate the need for the installation of specific hardware since new functions can be quickly deployed as one or more VMs. Examples of various VNFs include switches, routers, servers, tunneling gateway elements, traffic analysis functions, mobile network nodes or functions (e.g., Home Location Register, Home Subscriber Server, Mobility Management Entity, Serving General Packet Radio Services (GPRS) Support Node, Gateway GPRS Support Node, Policy Control Function, User Plane Function, Session Management Function, Access and Mobility Management Function, User Data Management Function), and security functions (e.g., firewalls, intrusion detection systems, virus scanners, spam protection).

BRIEF DESCRIPTION OF THE DRAWINGS

FIGS. 5A and 5B are flow diagrams of an exemplary process for relocating an AMF and a security gateway handling a UE's data traffic/signaling from a first data center to a second back-up data center based on an overload or failure condition occurring at the security gateway.

DETAILED DESCRIPTION OF EXAMPLE EMBODIMENTS

Figure 1:
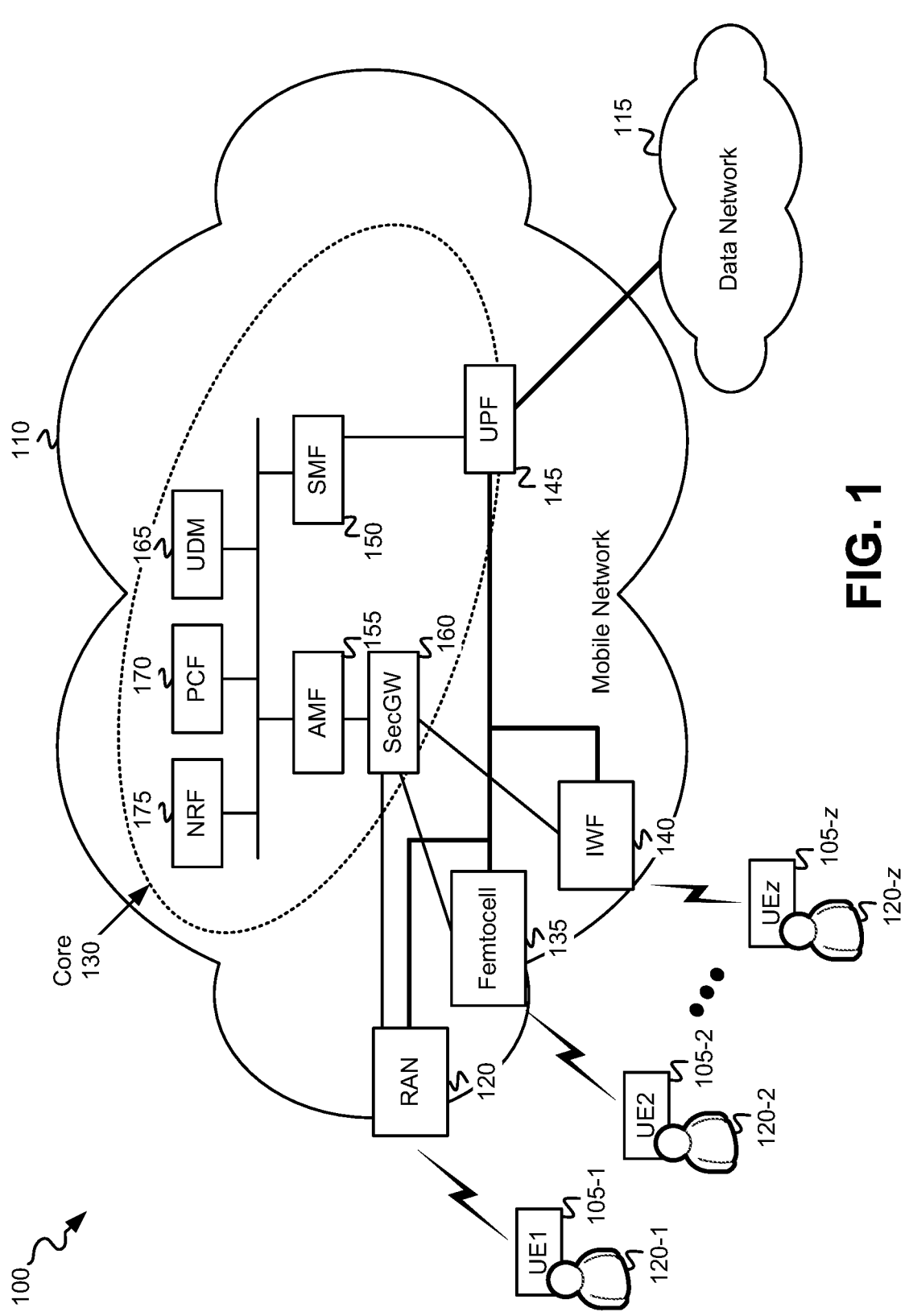
FIG. 1 depicts an example of a network environment in which Access and Mobility Management Functions (AMFs) and their security gateways may be relocated from one data center to another mated, geo-redundant data center based on security gateway overload or failure.

The following detailed description refers to the accompanying drawings. The same reference numbers in different drawings may identify the same or similar elements. The following detailed description does not limit the invention.

Network functions virtualization (NFV) is a network architecture that virtualizes classes of VNFs into building blocks that may connect, or chain together, to create network services. Network services have traditionally run on proprietary, dedicated hardware. With NFV, VNFs are packaged as VMs on commodity hardware. A NFV architecture typically includes a network functions virtualization infrastructure (NFVI) and a network functions virtualization management and orchestration architectural framework (NFV-MANO). NFVI includes the hardware and software components that build the environment where VNFs are deployed. The NFVI can span several different locations, with connectivity between the locations. The NFV-MANO includes a collection of functional blocks, data repositories, and interfaces through which the functional blocks of the NFV-MANO exchange information to manage and orchestrate the NFVI and VNFs.

"Cloud-native" is a type of NFV architecture for managing and orchestrating VNFs within a distributed cloud environment. In a cloud-native architecture, software is containerized, with each part of an application being packaged in its own "container." A container is a standard unit of software that packages code and its dependencies, libraries, other binaries, and configuration files so that the application can run reliably in multiple computing environments. Additionally, in a cloud-native architecture, the containerized software is dynamically orchestrated and managed to optimize resource utilization. The containerized software is further micro-services oriented to increase the agility and maintainability of the applications within the distributed cloud environment. Cloud-native VNFs typically have Application Programming Interfaces (APIs) which enable: 1) automated installation and configuration; 2) automated scaling based on dynamic requirements; 3) self-healing or fault tolerance; 4) automated monitoring and analysis of VNFs for errors, capacity management, and performance; and 5) automated upgrading and updating of the VNFs to provide new releases and apply patches. Cloud-native VNFs, therefore, are differentiated from traditional VNFs in their self-management capability and improved scalability.

NFV architectures, including cloud-native architectures, can implement redundancy concepts that enable execution of failover processes when errors or failures occur between communicating instances of VNFs or at particular VNFs. In NFV architectures, sets of VNFs may exist, where each set of VNFs may include a group of equivalent NF instances that can be used interchangeably to perform the same function, operation, or service. Each VNF in a set of VNFs may be located at multiple, distributed data centers and failover processes may occur between VNFs located in different data centers.

Current redundancy mechanisms in NFV architectures involve VNFs operating either in an active-active mode or in an active-standby mode. In active-active mode, each VNF instance of a VNF set actively runs a same kind of service simultaneously. In a VNF set where all VNF instances operate in an active-active mode, service requests are load-balanced across all available VNF instances in the VNF set. When a failure occurs on a particular VNF instance, another VNF instance in the VNF set takes its place. In an active-standby mode, however, only one VNF instance in the VNF set is in active mode while other VNF instances in the VNF set are in standby mode. The active mode VNF instance and the standby VNF instance or instances may synchronize with one another to facilitate the switching of service request handling from the active mode VNF instance to the standby VNF instance in the event of a failure or overload condition associated with the active mode VNF instance. In mobile networks, such as Fifth Generation (5G) networks, some VNFs operate in active-active mode while other VNFs operate in active-standby mode.

In mobile networks, new security requirements are being applied to certain data traffic within the mobile network to prevent interception and eavesdropping of the data traffic. For example, the N2 interface between the radio interface and the Access and Mobility Management Function (AMF) can be vulnerable to interception and eavesdropping, and existing AMFs lack encryption functionality for dealing with this vulnerability. Therefore, recent mobile network security innovations have deployed a security gateway, together with each AMF, to provide encryption functionality to enable the establishment of encrypted tunnels between a mobile network entry node(s) and the security gateway over the N2 interface to the AMF. The mobile network entry node may be any node that acts as an "entry node" into the mobile network from a User Equipment device (UE) that may either be connected directly to the mobile network, or may be connected to the mobile network via another network (e.g., another mobile network). For example, the mobile network entry node may include a device or node in the Radio Access Network (RAN), a device or node of a femtocell, or an Interworking Function (IWF) that interconnects the mobile network with another network.

With deployment of a security gateway together with each AMF in the mobile network for purposes of securing N2 interface data traffic, and also recognizing that security gateways typically operate in active-standby mode for purposes of redundancy, failure or overload conditions at the security gateways can create issues with the security of the N2 interface connection to the AMF when failover needs to occur to another security gateway. Example embodiments described herein distribute active and standby AMFs and security gateways across multiple, mated, geo-redundant data centers and implement security gateway and AMF relocation processes that reestablish the security of the N2 interface connection between the radio interface and the AMFs in the mobile network when security gateway failure or overload conditions occur.

FIG. 1 depicts an example of a network environment 100 in which AMFs and their security gateways may be relocated from one data center to another mated, geo-redundant data center based on security gateway overload or failure. As shown, network environment 100 may include UEs 105-1 through 105-z, a mobile network 110, and a data network(s) 115.

UEs 105-1 through 105-z (generically referred to herein as a "UE 105" or "UEs 105") may each include any type of device having a communication capability such as, for example, a wireless communication capability. UEs 105 may include, for example, a laptop, notebook, wearable, or tablet computer; a cellular phone (e.g., a "smart" phone); a Voice over Internet Protocol (VoIP) phone; an audio speaker (e.g., a "smart" speaker); a video gaming device; a music player (e.g., a digital audio player); a digital camera; a device in a vehicle; a wireless telematics device; an Augmented Reality/Virtual Reality (AR/VR) headset or glasses; or an Internet of Things (IoT) or Machine-to-Machine (M2M) device. A user may carry, use, administer, and/or operate each UE 105. A user 120-1 is shown in association with UE 105-1, a user 120-2 is shown in association with UE 105-2, and a user 120-z is shown in association with UE 105-z. Users 120-1 through 120-z may each be generically referred to herein as a "user 120," or may be alternatively referred to herein as a "subscriber 120."

Mobile network 110 may include a Public Land Mobile Network (PLMN) (referred to herein as a "mobile network 110" or a "network 110") and possibly one or more other networks (not shown). Mobile network 110 may be composed of other sub-networks, such as a Radio Access Network 120, and a mobile core network 125. Mobile network 110 may additionally include a femtocell 135 and an Interworking Function (IWF) 140.

RAN 120 may include various types of radio access equipment that implement Radio Frequency (RF) communication with UEs 105. The radio access equipment of RAN 120 may include, for example, multiple Remote Radio Units (RRUs) and at least one baseband unit (BBU). Each of the RRUs includes devices that operate as a radio function unit which transmit and receive RF signals to/from UEs 105. Each BBU interconnects with the distributed RRUs of RAN 120 via fronthaul links or a fronthaul network. RAN 120 may additionally include other nodes, functions, and/or components not described herein. Each BBU may be functionally split into a centralized unit (CU) and one or more distributed units (DUs).

Core network 130 includes devices or nodes that perform network functions (NFs) that operate the mobile network 110 including, among other NFs, mobile network access management, session management, and policy control NFs. In the example network environment 100 of FIG. 1, core network 130 is shown as including a Fifth Generation (5G) mobile network that further includes 5G Network Functions (NFs), such as a User Plane Function (UPF) 145, a Session Management Function (SM F) 150, an Access and Mobility Management Function (AMF) 155 and an associated Security Gateway (SecGW) 160, a Unified Data Management (UDM) function 165, a Policy Control Function (PCF) 170, and a Network Repository Function (NRF) 175. IWF 140, UPF 145, SM F 150, AMF 155, SecGW 160, UDM 165, PCF 170, and NRF 175 may be implemented as virtual network functions (VNFs) within mobile network 110.

Femtocell 135 includes devices or nodes associated with a low-power radio base station designed for small scale service locations (e.g., residential or business). Each femtocell 135 may connect to an Internet service provider's network through a broadband connection (e.g., cable, Digital Subscriber Line (DSL), fiber optic connection). Though not shown in FIG. 1, femtocell 135 also connects to data network 115. Femtocell 135 supports the use of encrypted tunnels (e.g., IPSec tunnels) with SecGWs 160 in mobile network 110.

Figure 2:
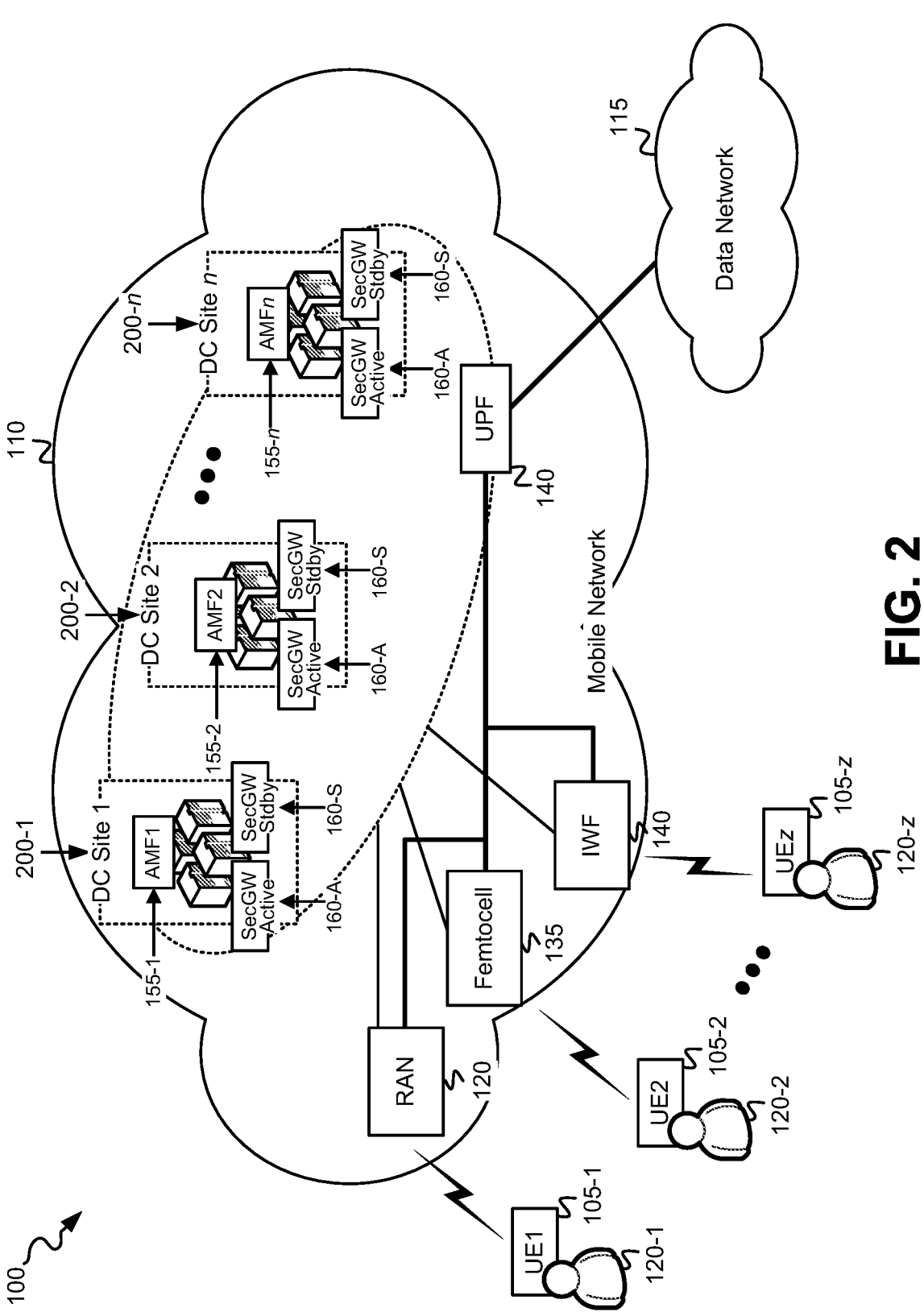
FIG. 2 illustrates an example of network environment in which redundant AMFs and Security Gateways are located at multiple different data centers at multiple different sites within a mobile network.

IWF 140 may act as a gateway to interconnect mobile network 110 with other networks (not shown in FIG. 2). For example, if mobile network 110 is a 5G network, IWF 140 may act as a gateway to interconnect a RAN of a Fourth Generation (4G), a Third Generation (3G), and/or a non-5G network with the mobile network 110. IWF 140, thus, supports multi-Radio Access Technology (multi-RAT) involving different types of RANs that may interconnect with mobile network 110. UEs 105 directly connected to the RAN of another mobile network may, therefore, send data traffic to, and receive data traffic from, mobile network 110 via IWF 140. In the case where mobile network 110 is a 5G network, IWF 140 may include a non-Third Generation Partnership Project (3GPP) Interworking Function (N3IWF). IWF 140 may support the N2 and N3 interfaces towards core network 130 of mobile network 110, and further may support the establishment of encrypted tunnels (e.g., IPSec tunnels) with SecGWs 160 in mobile network 110.

UPF 145 may act as a router and a gateway between mobile network 110 and a data network 115, and forwards session data between data network 115 and RAN 120, femtocell 135, and/or IWF 140. Though only a single UPF 145 is shown in FIG. 1, mobile network 110 may include multiple UPFs 145 at various locations in network 110. SMF 150 performs session management, allocates network addresses to UEs 105, and selects and controls UPFs 145 for data transfer. AMF 155 performs authentication, authorization, and mobility management for UEs 105. SecGW 160 engages in an encryption key management protocol such as, for example, Internet Key Exchange (IKE) (e.g., IKEv2), in conjunction with a mobile network entry node such as, for example, a node/device of RAN 120, a node/device of femtocell 135, or an IWF 140, to enable the establishment of an encrypted tunnel between the mobile network entry node and SecGW 160 using an encryption protocol. In one implementation, the encryption protocol may include the Internet Protocol Security (IPSec) protocol and the encrypted tunnel may be an IPSec tunnel. SecGW 160, therefore, enables secure communication, over the N2 interface, between RAN 120, femtocell 135, or IWF 140 and core network 130 of mobile network 110.

UDM 165 manages data for user access authorization, user registration, and data network profiles. UDM 165 may include, or operate in conjunction with, a User Data Repository (UDR—not shown) which stores user data, such as customer profile information, customer authentication information, user-subscribed network slice information, and encryption keys. PCF 170 implements policy and charging control for service data flows and Protocol Data Unit (PDU) session related policy control.

NRF 175 operates as a centralized repository of information regarding NFs in mobile network 110. NRF 175 maintains an updated repository of information about the NFs available in mobile network 110, along with information about the services provided by each of the NFs. NRF 175, using the centralized repository, enables NFs (e.g., UPF 145, SMF 150, AMF 155, SecGW 160, UDM 165) to register and discover each other via an Application Programming interface (API). NRF 175 further enables the NFs to obtain updated status information of other NFs in mobile network 110. NRF 175 may, for example, maintain profiles of available NF instances and their supported services, allow NF instances to discover other NF instances in mobile network 110, and allow NF instances to track the status of other NF instances.

Data network 115 may include one or more interconnected networks, such as local area networks (LANs), wide area networks (WANs), metropolitan area networks (MANs), and/or the Internet. Data network 115 may connect with UPFs 145 of mobile network 110.

The configuration of network components of the example network environment 100 of FIG. 1 is for illustrative purposes. Other configurations may be implemented. Therefore, network environment 100 may include additional, fewer, and/or different components that may be configured in a different arrangement than that depicted in FIG. 1. For example, core network 130 may include other NFs not shown in FIG. 1. As a further example, though mobile network 110 is depicted in FIG. 1 as a 5G network having 5G network components/functions, mobile network 110 may alternatively include a 4G or 4.5G network with corresponding network components/functions, or a hybrid 5G/4G network that includes certain components of both a Next Generation network (e.g., a 5G network) and a 4G Long Term Evolution (LTE) network. Mobile network 110 may alternatively include another type of Next Generation network, other than the 5G network shown in FIG. 1. Additionally, though only a single one of each of the NFs UPF 145, SMF 150, AMF 155, SecGW 160, UDM 165, PCF 170, and NRF 175 is shown in FIG. 1, network environment 100 (e.g., core network 130 of mobile network 110) may include multiple instances of each of these NFs. In one example, as described with respect to FIGS. 3A-3D below, each AMF 155 may be associated with an active SecGW 160, located at a first data center, and a standby SecGW 160 located at a second data center.

FIG. 2 illustrates an example of network environment 100 in which redundant AMFs and Security Gateways are located at multiple different data centers at multiple different sites within mobile network 110. As shown, mobile network 110 may include data centers (DCs) residing at multiple different sites 200-1 through 200-n (where n is greater than or equal to two). Each of DC sites 200-1 through 200-n (generically referred to herein as "DC site 200" or "DC sites 200") may be in a different geographic location within mobile network 110. In some implementations, a group of multiple DC sites 200 (e.g., DC site 200-1 and DC site 200-2) may be in geographic proximity with one another for implementing mated geo-redundancy between AMFs 155 and SecGWs 160 residing at each DC site 200. Each DC at each site 200 may include one or more computational devices that are networked together to provide computing and storage resources for, for example, executing NFs such as, for example, AMFs 155 and SecGWs 160. Each DC site 200 may further include other components (e.g., routers, switches, firewalls), not shown in FIG. 2, that enable the DC to support data processing and data communications.

In an implementation in which network environment 100 of FIG. 2 is implemented by a NFV architecture, AMFs 155 and SecGWs 160 may be VNFs that are selectively installed, provisioned, and/or instantiated at particular ones of DC sites 200-1 through 200-n. For example, AMF 155-1, active SecGW 160-A, and standby SecGW 160-S may be installed at DC site 200-1. As another example, AMF 155-2, active SecGW 160-A, and standby SecGW 160-S may be installed at DC site 200-2. As an additional example, AMF 155-n, active SecGW 160-A, and standby SecGW 160-S may be installed at DC site 200-n. Therefore, in the example network environment 100 of FIG. 2, DC site 200-1 may execute AMF 155-1, active SecGW 160-A, and standby SecGW 160-S. DC site 200-2 may execute AMF 155-2, active SecGW 160-A, and standby SecGW 160-S. DC site 200-n may execute AMF 155-n, active SecGW 160-A, and standby SecGW 160-S.

As described herein, if active SecGW 160-A at DC site 200-1 incurs a failure condition or an overload, traffic handled by the SecGW 160-A may first be relocated to a standby SecGW 160-S at another DC site 200 (e.g., DC site 200-2) before relocation of both the serving AMF and the active SecGW to the other DC site 200. If active SecGW 160-A at DC site 200-2 incurs a failure condition or overload, traffic handled by the SecGW 160-A may first be relocated to a standby SecGW 160-S at another DC site 200 (e.g., DC site 200-1) before relocation of both the serving AMF and the active SecGW to the other DC site 200.

Figure 3A:
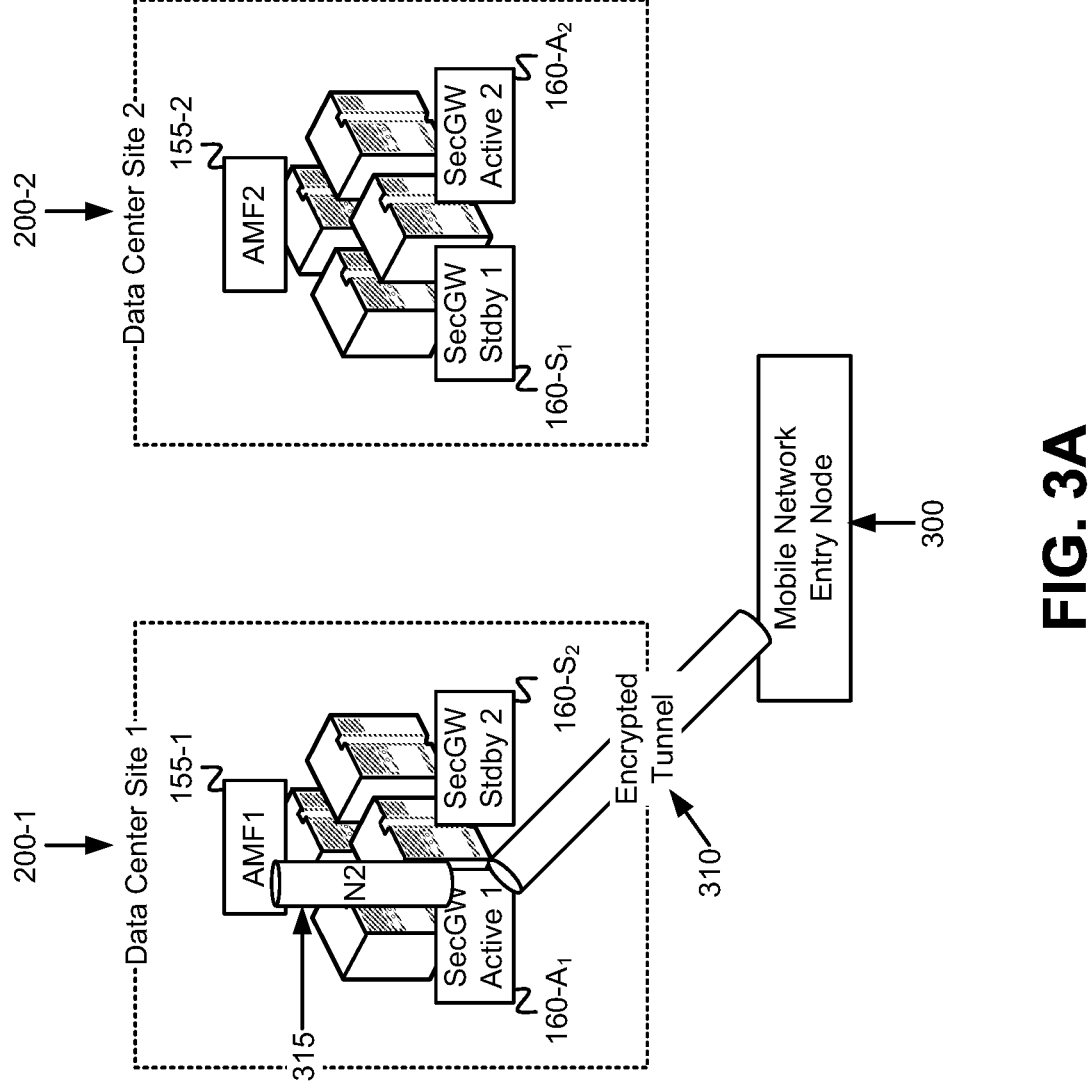
FIGS. 3A-3C illustrate an example of security gateway and AMF relocation between data center sites due to security gateway overload or failure.
Figure 3B:
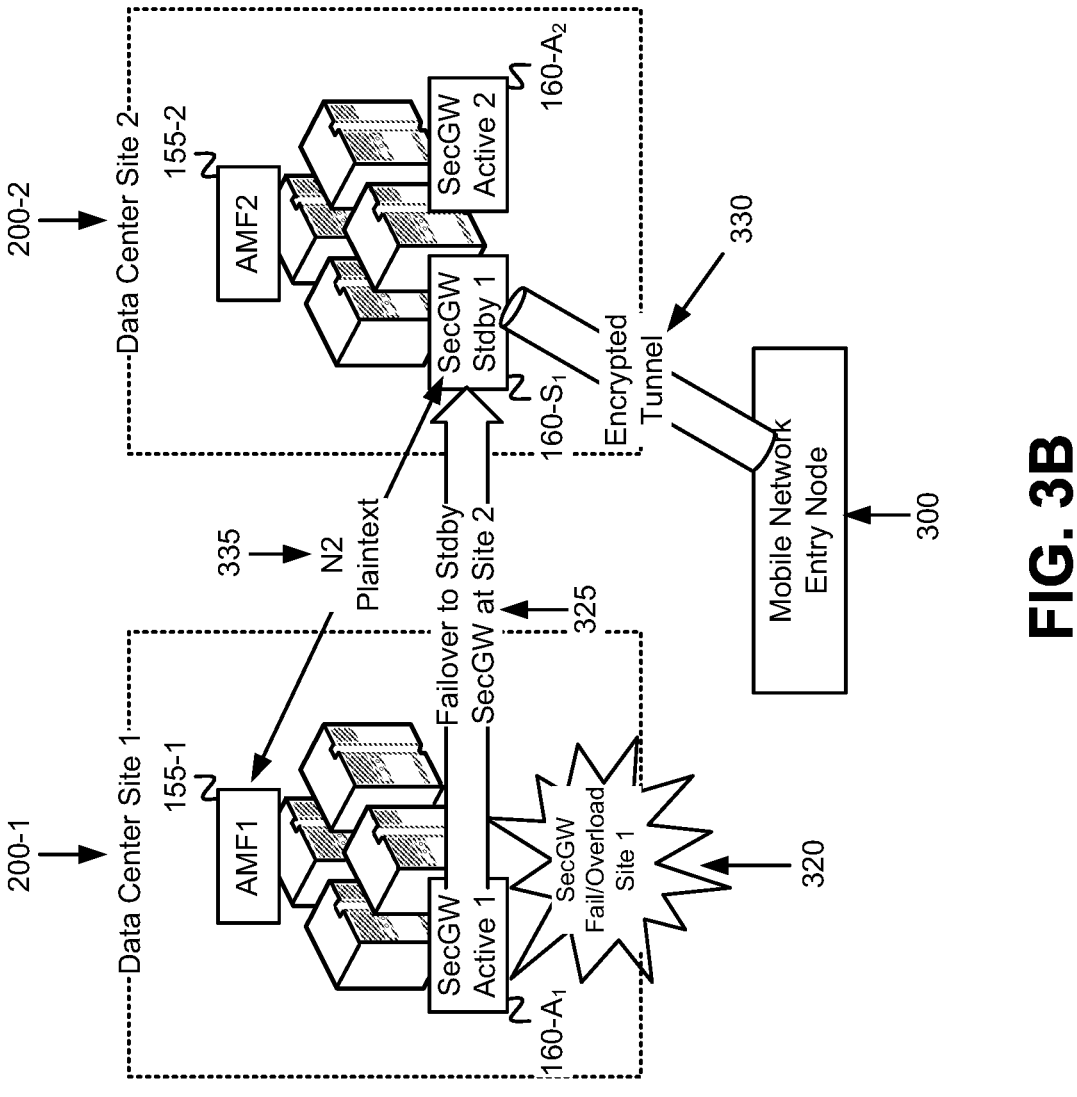
Figure 3C:
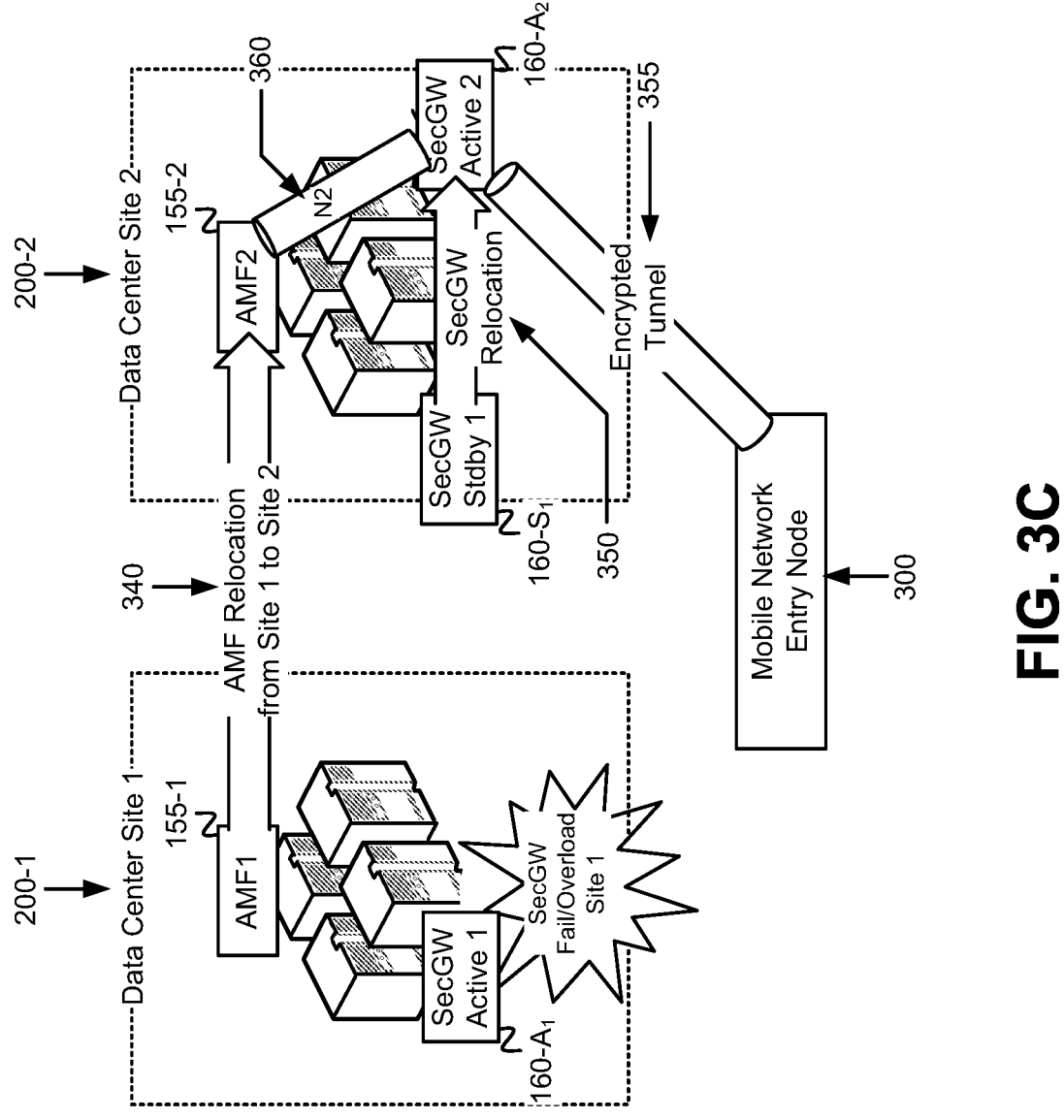

FIGS. 3A-3C illustrate an example of SecGW and AMF relocation between DC sites due to SecGW overload or failure. As shown in FIG. 3A, a mobile network entry node 300 may initially have established an encrypted tunnel 310 with an active SecGW 160-A$_1$ at DC site 200-1 using a key management protocol (e.g., IKEv2) and an encryption protocol (e.g., IPSec). The mobile network entry node 300 may include, for example, a device/node of RAN 120 (e.g., a CU or BBU), a device/node of a femtocell 135, or an IWF 140. The active SecGW 160-A$_1$ at DC site 200-1 further establishes an N2 interface connection 315 with the AMF 155-1. Since AMF 155-1 is co-located with the active SecGW 160-A$_1$ at DC site 200-1 encryption over the N2 interface connection 315 between SecGW 160-A$_1$ and AMF 155-1 is not necessary, and data transfer between SecGW 160-A$_1$ and AMF 155-1 may involve plaintext data over the N2 interface.

Data traffic from mobile network entry node 300 to AMF 155-1 transits the encrypted tunnel 310 to active SecGW 160-A$_1$, which decrypts and forwards the data traffic across the N2 interface connection 315, in plaintext form, to AMF 155-1. In the reverse direction, data traffic from AMF 155-1 to mobile network entry node 300 transits the N2 interface connection 315 to active SecGW 160-A$_1$, which then encrypts the data traffic and forwards the traffic over the encrypted tunnel 310 to mobile network entry node 300. The data traffic from mobile network entry node 300 may include data traffic received by RAN 120 from UE 105-1, data traffic received by femtocell 135 by UE 105-2, or data traffic received by IWF 140 from UE 105-z via, for example, another network connected to mobile network 110 at IWF 140.

As further shown in FIG. 3A, a second DC site 200-2 may include a second AMF 155-2, a standby SecGW 160-S$_1$ that serves as a back-up standby SecGW for data traffic handled by SecGW 160-A$_1$ at DC site 200-1, and an active SecGW 160-A$_2$ that forwards data traffic to/from AMF 155-2. DC site 200-1 may include a second standby SecGW 160-S$_2$ that serves as a back-up standby SecGW for data traffic handled by SecGW 160-A$_2$ at DC site 200-2.

FIG. 3B depicts an occurrence of a failure or overload condition 320 at active SecGW 160-A$_1$ at DC site 200-1 subsequent to the initial establishment of the encrypted tunnel 310 between mobile network entry node 300 and SecGW 160-A$_1$, as previously shown in FIG. 3A. At the occurrence of the failure or overload condition 320 at active SecGW 160-A$_1$, mobile network entry node 300 initiates a failover process 325 to a standby SecGW 160-S$_1$ at DC site 200-2. The failover process 325 includes mobile network entry node 300 establishing a second encrypted tunnel 330 with standby SecGW 160-S$_1$ at DC site 200-2. The failover process 325 additionally includes SecGW 160-S$_1$ establishing a plaintext N2 interface connection 335 with AMF 155-1 in DC site 200-1. Data traffic may temporarily transit from mobile network entry node 300 to AMF 155-1 at DC site 200-1 via encrypted tunnel 330 and plaintext N2 interface connection 335. When AMF 155-1 detects the plaintext traffic/signaling from a non-local SecGW (e.g., SecGW 160-S$_1$ at DC site 200-2), AMF 155-1 notifies mobile network entry node 300 to perform a NAS Reroute. The notification from AMF 155-1 may identify the target AMF in the back-up data center site (e.g., AMF 155-2 in data center site 200-2 in the example of FIG. 3B).

Mobile network entry node 300, upon receipt of the notification from AMF 155-1, may, as shown in FIG. 3C, initiate AMF relocation 340 from DC site 200-1 to DC site 200-2 by sending a registration request message to AMF 155-2 and, upon AMF relocation completion, mobile network entry node 300 sends a release request to AMF 155-1 at DC site 200-1. AMF 155-2 initiates SecGW relocation 350 from the standby SecGW at the DC site to the active SecGW at the DC site. SecGW relocation 350 includes network entry node 300 establishing a third encrypted tunnel 355 with active SecGW 160-A$_2$ at DC site 200-2, and additionally includes SecGW 160-A$_2$ establishing a plaintext N2 interface connection 360 with AMF 155-2 in DC site 200-2. Data traffic from mobile network entry node 300 to AMF 155-2 subsequently transits the encrypted tunnel 355 to SecGW 160-A$_2$, and SecGW 160-A$_2$ forwards the data traffic to AMF 155-2 in plaintext form via N2 interface connection 360. In the reverse direction, data traffic/signaling from AMF 155-2 transits to SecGW 160-A$_2$ in plaintext form via the N2 interface connection 360, and SecGW 160-A$_2$ encrypts and forwards the data traffic/signaling to mobile network entry node 300 via encrypted tunnel 355.

Figure 4:
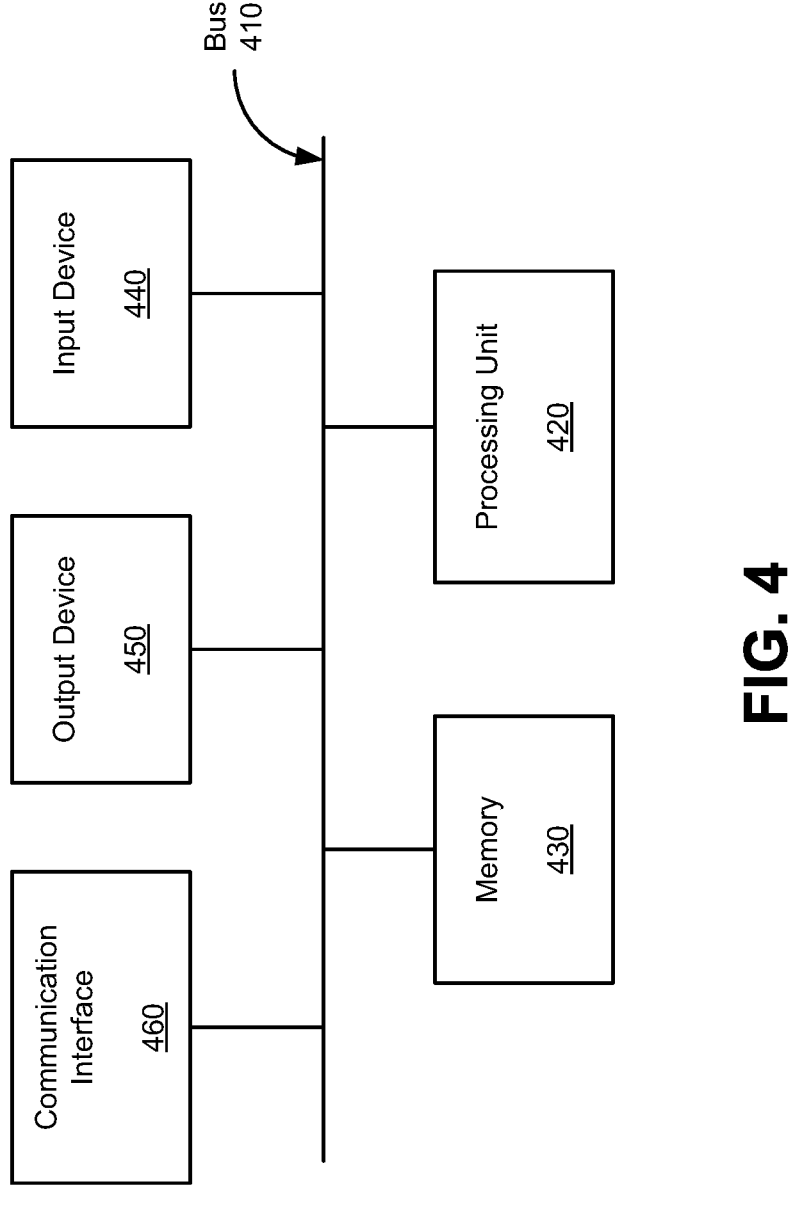
FIG. 4 depicts exemplary components of a network device that may correspond to various devices described herein, or which may implement various network functions described herein.

FIG. 4 is a diagram that depicts exemplary components of a network device 400 (referred to herein as a "network device" or a "device"). UEs 105, RRUs and BBUs of RAN 120, and a device/node of femtocell 135 may each include components that are the same as, or similar to, those of device 400 shown in FIG. 4. Furthermore, each of the NFs IWF 140, UPF 145, SMF 150, AMF 155, SecGW 160, UDM 165, PCF 170, and NRF 175 may be implemented by a network device that includes components that are the same as, or similar to, those of device 400. Some of the NFs IWF 140, UPF 145, SMF 150, AMF 155, SecGW 160, UDM 165, PCF 170, and NRF 175 may be implemented by a same device 400 within network environment 100, while others of the functions may be implemented by one or more separate devices 400 within network environment 100.

Device 400 may include a bus 410, a processing unit 420, a memory 430, an input device 440, an output device 450, and a communication interface 460. Bus 410 may include a path that permits communication among the components of device 400. Processing unit 420 may include one or more processors or microprocessors which may interpret and execute instructions, or processing logic. Memory 430 may include one or more memory devices for storing data and instructions. Memory 430 may include a random access memory (RAM) or another type of dynamic storage device that may store information and instructions for execution by processing unit 420, a Read Only Memory (ROM) device or another type of static storage device that may store static information and instructions for use by processing unit 420, and/or a magnetic, optical, or flash memory recording and storage medium. The memory devices of memory 430 may each be referred to herein as a "tangible non-transitory computer-readable medium," "non-transitory computer-readable medium," or "non-transitory storage medium." In some implementations, the processes/methods set forth herein can be implemented as instructions that are stored in memory 430 for execution by processing unit 420.

Input device 440 may include one or more mechanisms that permit an operator to input information into device 400, such as, for example, a keypad or a keyboard, a display with a touch sensitive panel, voice recognition and/or biometric mechanisms, etc. Output device 450 may include one or more mechanisms that output information to the operator, including a display, a speaker, etc. Input device 440 and output device 450 may, in some implementations, be implemented as a user interface (UI) that displays UI information and which receives user input via the UI. Communication interface 460 may include a transceiver(s) that enables device 400 to communicate with other devices and/or systems. For example, communication interface 460 may include one or more wired and/or wireless transceivers for communicating via mobile network 110, mobile core network 130, and/or data network 115. In the case of RRUs of RAN 120, communication interface 460 may further include one or more antenna arrays for implementing radio frequency (RF) cell sectors.

The configuration of components of network device 400 illustrated in FIG. 4 is for illustrative purposes. Other configurations may be implemented. Therefore, network device 400 may include additional, fewer and/or different components, that may be arranged in a different configuration, than depicted in FIG. 4.

Figure 5B:
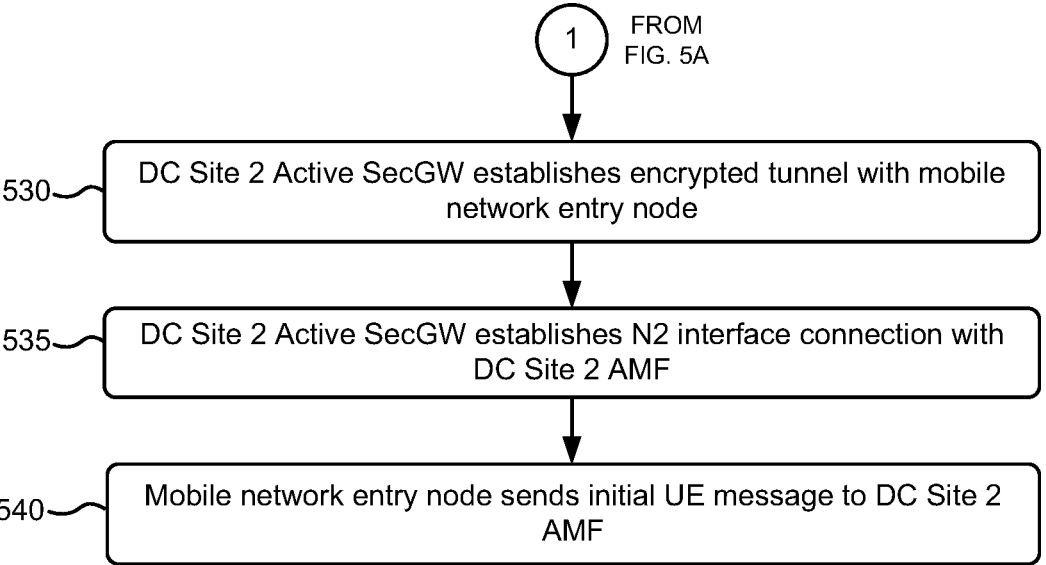

FIGS. 5A and 5B are flow diagrams of an exemplary process for relocating an AMF 155 and SecGW 160 handling a UE's data traffic/signaling from a first data center to a second back-up data center based on an overload or failure condition occurring at a SecGW 160 associated with the AMF 155. In one implementation, the exemplary process of FIGS. 5A and 5B may be implemented by a mobile network entry node 300 in conjunction with SecGWs 160 and AMFs 155. The mobile network entry node 300 may include, for example, a device(s)/node(s) of RAN 120, a device(s)/node(s) of femtocell 135, or IWF 140. In other implementations, the exemplary process of FIGS. 5A and 5B, or portions of the process of FIGS. 5A and 5B may be implemented by one or more additional, or different, NFs or devices in mobile network 110. The exemplary process of FIGS. 5A and 5B is described with additional reference to FIGS. 6A and 6B.

Figure 6A:
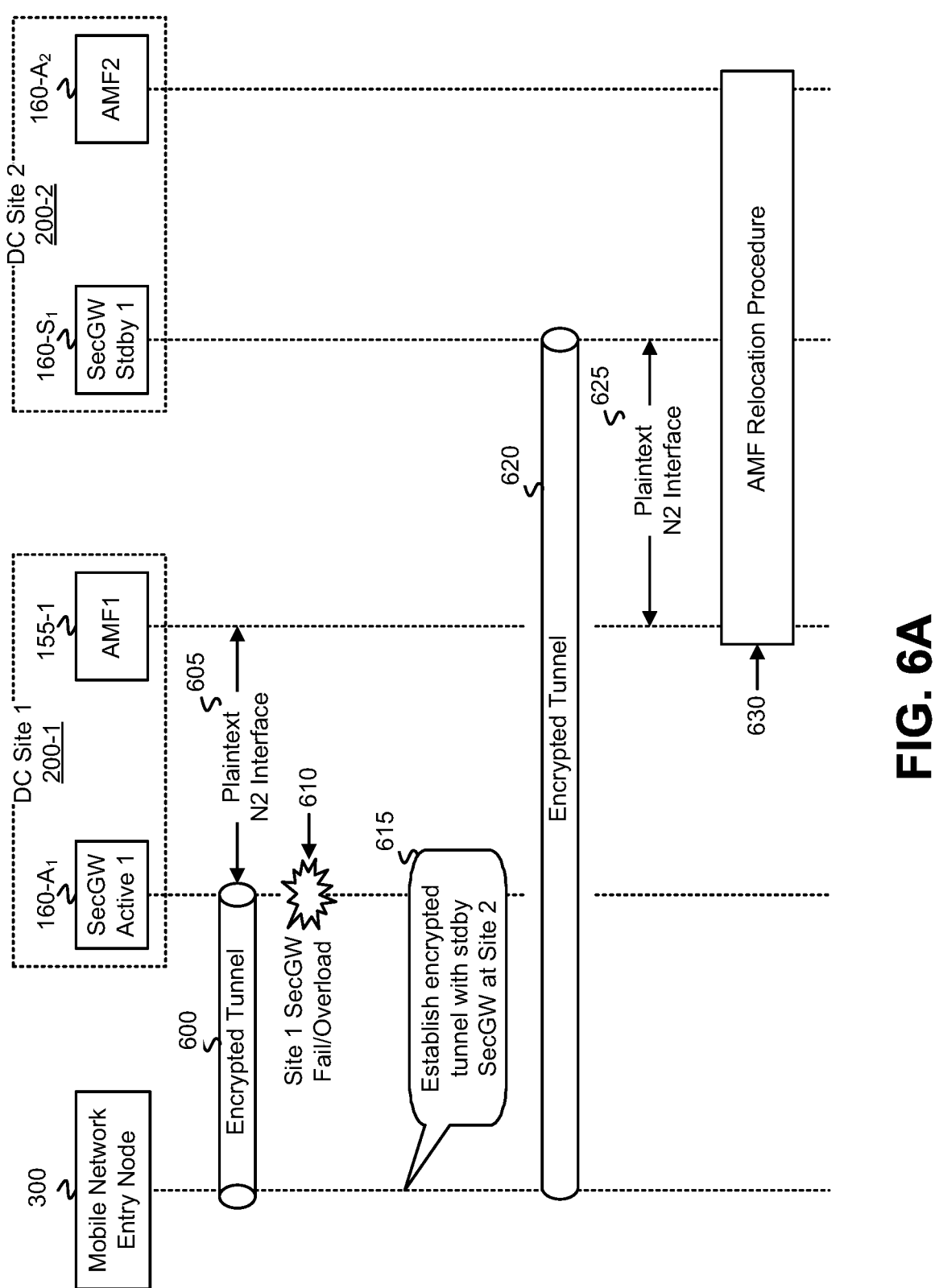
FIGS. 6A and 6B depict exemplary operations, messages, and/or data flows associated with an exemplary process.

The exemplary process includes mobile network entry node 300 establishing an initial N2 interface connection with AMF 155-1 at DC site 200-1 via SecGW 160-A₁ at DC site 200-1 (block 500). As shown in FIG. 6A, the initial N2 interface connection includes an encrypted tunnel 600 between mobile network entry node 300 and SecGW 160-A₁ at DC site 200-1 and a plaintext N2 interface connection 605 between SecGW 160-A₁ and AMF 155-1. Mobile network entry node 300 may receive one or more data units (e.g., packets) or messages from a UE 105 and send the data units/messages to SecGW 160-A₁, via tunnel 600, for forwarding to AMF 155-1, via the N2 interface 605, for AMF processing.

Mobile network entry node 300 determines whether a failure or overload condition has occurred at SecGW 160-A₁ at DC site 200-1 (block 505). If a failure or overload condition has occurred at SecGW 160-A₁ (YES—block 505), then mobile network entry node 300 initiates a failover process from the active SecGW 160-A₁ in DC site 200-1 to the standby SecGW 160-S₁ in DC site 200-2. The failover process includes establishing an encrypted tunnel with the standby SecGW at DC site 200-2 (block 510), and the standby SecGW at DC site 200-2 establishing a plaintext N2 interface connection with AMF 155-1 at DC site 200-1 (block 515). FIG. 6A shows an occurrence of a SecGW failure or overload 610 at DC site 200-1, and, in response, mobile network entry node 300 establishing 615 an encrypted tunnel 620 with the standby SecGW 160-S₁ at DC site 200-2. In turn, the standby SecGW at DC site 200-2, as shown in FIG. 6A, establishes a plaintext N2 interface connection 625 with AMF 155-1 at DC site 200-1. During an interim period, prior to AMF relocation in block 520 below and SecGW relocation in block 525 below, mobile network entry node 300 may receive one or more data units (e.g., packets) or messages from a UE 105 and send the data units/messages to standby SecGW 160-S₁, via tunnel 620, for forwarding to AMF 155-1, via the N2 interface 625, for AMF processing.

AMF 155-1 at DC site 200-1 and AMF 155-2 at DC site 200-2 engage in an AMF relocation procedure (block 520). When AMF 155-1 detects unencrypted plaintext signaling from a non-local SecGW (e.g., SecGW 160-S₁ at DC site 200-2), AMF 155-1 sends a notification to mobile network entry node 300 to initiate a NAS Reroute. The notification message from AMF 155-1 may include an identification of a target AMF (e.g., AMF 155-2 at DC site 200-2). Receipt of the notification from AMF 155-1 at mobile network entry node 300 triggers a registration request from mobile network entry node 300 to AMF 155-2 at DC site 200-2. Upon completion of the registration with AMF 155-2, mobile network entry node 300 (or AMF 155-2) sends a message to AMF 155-1 at DC site 200-1 to request a release. The AMF relocation process completes with AMF 155-1 at DC site 200-1 releasing mobile network entry node 300.

Figure 6B:
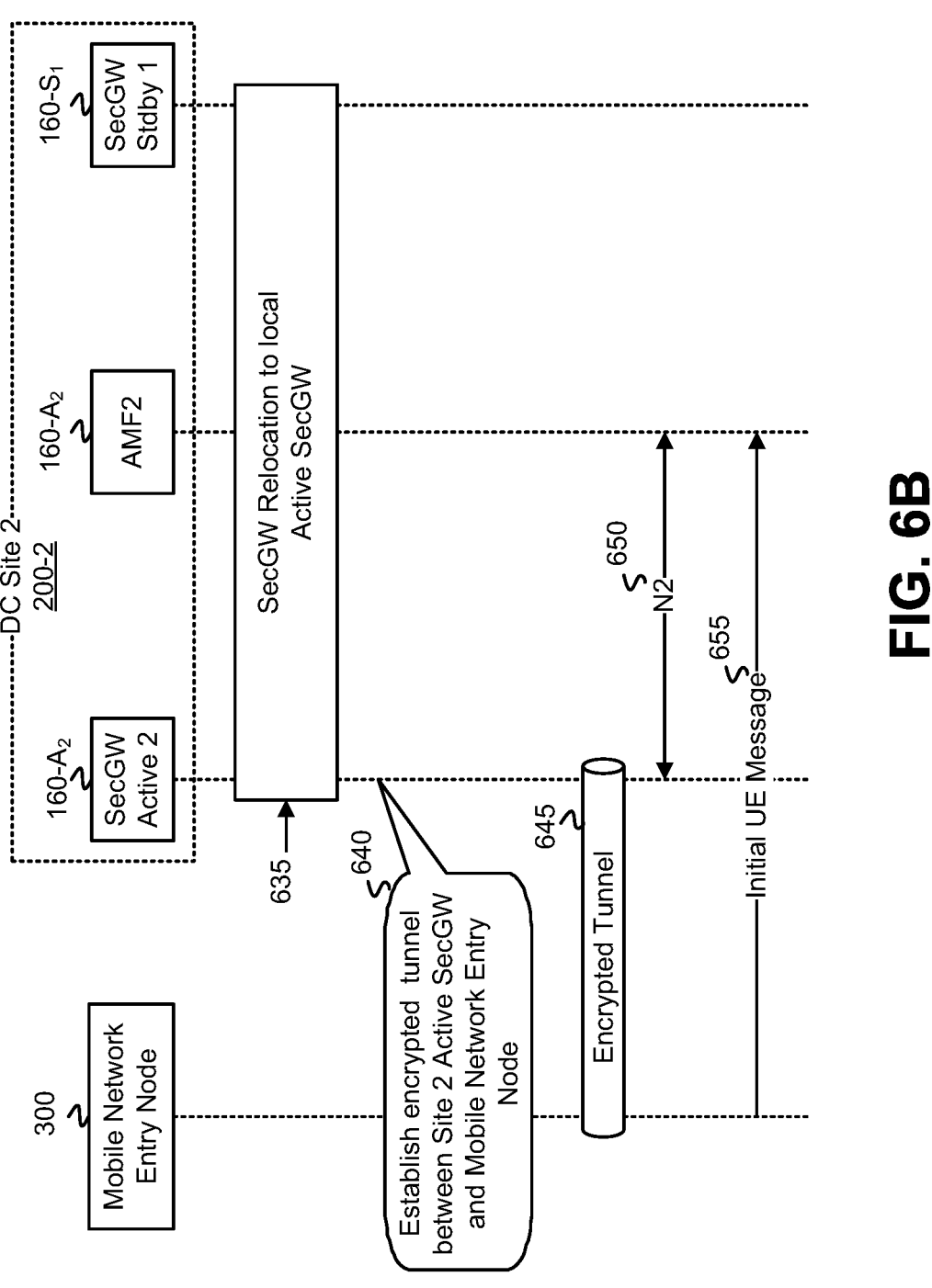

The DC site 2 AMF 155-2 and the standby SecGW 160-S₁ at DC site 200-2 engage in a SecGW Relocation Procedure (block 525) to relocate to a local active SecGW. The SecGW Relocation Procedure relocates the active SecGW to SecGW 160-A₂ at DC site 200-2. After AMF relocation, at block 520 above, AMF 155-2 at DC site 200-2 switches from the standby SecGW 160-S₁ to the SecGW configured as the active SecGW for DC site 200-2 (e.g., SecGW 160-A₂). FIG. 6B depicts standby SecGW AMF 160-A₂, and SecGW 160-A₂ engaging in a SecGW Relocation procedure 635 to relocate the SecGW serving the AMF to the local active SecGW (e.g., SecGW 160-A₂).

SecGW 160-A₂ at DC site 200-2 establishes an encrypted tunnel with the mobile network entry node 300 (block 530), and also establishes a plaintext N2 interface connection with AMF 155-2 at DC site 200-2 (block 535). To establish the encrypted tunnel, mobile network entry node 300 and SecGW 160-A₁ may, for example, engage in IKEv2 to establish an Internet Protocol Security (IPSec) encrypted tunnel. Subsequent to establishment of the encrypted tunnel, SecGW 160-A₂ receives and decrypts encrypted data traffic from mobile network entry node 300 and forwards the decrypted plaintext data traffic to AMF 155-2 via the N2 interface connection. Additionally, SecGW 160-A₂ receives plaintext traffic/signaling from AMF 155-2, via the N2 interface connection, and encrypts the data traffic/signaling and forwards the encrypted data traffic to mobile network entry node 300 via the encrypted tunnel. FIG. 6B shows SecGW 160-A₂ establishing 640 an encrypted tunnel 645 with mobile network entry node 300, and establishing an N2 interface connection 650 with AMF 160-A₂.

Mobile network entry node 300 sends an initial UE message to AMF 155-2 at DC site 200-2 (block 540). Mobile network entry node 300 receives an initial message from a UE 105 and forwards the UE message to AMF 155-2. The initial UE message transits the encrypted tunnel 645 between mobile network entry node 300 and SecGW 160-A₂ at DC site 200-2, and the unencrypted N2 interface connection between SecGW 160-A₂ and AMF 160-A₂. AMF 155-2, upon receipt of the UE message, may handle the message in accordance with existing AMF processes. FIG. 6B shows mobile network entry node 300 sending the initial UE message 655 to AMF 160-A₂ at DC site 200-2.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 5A and 5B, and sequences of operations, messages, and/or data flows with respect to FIGS. 3A-3C, 6A, and 6B, the order of the blocks and/or the operations, messages, and/or data flows may be varied in other implementations. Moreover, non-dependent blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processing unit 220) of a device. A non-transitory storage medium includes one or more of the storage mediums described in relation to memory 230. The non-transitory computer-readable storage medium may be implemented in a centralized, distributed, or logical division that may include a single physical memory device or multiple physical memory devices spread across one or multiple network devices.

To the extent the aforementioned embodiments collect, store or employ personal information of individuals, such information shall be collected, stored, and used in accordance with all applicable laws concerning protection of personal information. Additionally, the collection, storage and use of such information can be subject to consent of the individual to such activity, for example, through well known "opt-in" or "opt-out" processes as can be appropriate for the situation and type of information. Collection, storage and use of personal information can be in an appropriately secure manner reflective of the type of information, for example, through various encryption and anonymization techniques for particularly sensitive information.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

All structural and functional equivalents to the elements of the various aspects set forth in this disclosure that are known or later come to be known to those of ordinary skill in the art are expressly incorporated herein by reference and are intended to be encompassed by the claims.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

establishing, by a mobile network entry node, a first encrypted tunnel with a first active N2 interface security gateway at a first data center to enable the mobile network entry node to communicate, via the first encrypted tunnel, an N2 interface, and the first active N2 interface security gateway, with a first access and mobility management function (AMF), paired with the first active N2 interface security gateway, at the first data center, wherein the mobile network entry node comprises a device in a Radio Access Network (RAN), a device associated with a femtocell connected to a mobile network, or an Interworking Function (IWF) that enables interworking between one or more other networks and the mobile network;

determining an occurrence of a failure or overload condition at the first active N2 interface security gateway at the first data center;

establishing, by the mobile network entry node based on the determined occurrence of the failure or overload condition at the first active N2 interface security gateway, a second encrypted tunnel with a standby N2 interface security gateway at a second data center to temporarily pair the standby N2 interface security gateway at the second data center with the first AMF at the first data center and enable the mobile network entry node to communicate, via the second encrypted tunnel, the N2 interface, and the standby N2 interface security gateway, with the first AMF at the first data center;

initiating, by the mobile network entry node based on the determined occurrence of the failure or overload condition at the first active N2 interface security gateway, AMF relocation from the first AMF at the first data center to a second AMF at the second data center; and initiating, in coordination with the AMF relocation, security gateway relocation from the standby N2 interface security gateway at the second data center to a second active N2 interface security gateway at the second data center to pair the second active N2 interface security gateway with the second AMF.

2. The method of claim 1, further comprising:

establishing, by the mobile network entry node, based on the coordinated AMF relocation and security gateway relocation, a third encrypted tunnel with the second active N2 interface security gateway to enable the mobile network entry node to communicate, via the third encrypted tunnel, the N2 interface, and the second active N2 interface security gateway, with the paired second AMF at the second data center; and forwarding, by the mobile network entry node via the third encrypted tunnel, the N2 interface, and the second active N2 interface security gateway, at least one third User Equipment device (UE) message to the second AMF at the second data center.

3. The method of claim 2, further comprising:

engaging, by the mobile network entry node in conjunction with the first active N2 interface security gateway paired with the first AMF at the first data center, in an encryption key management protocol for establishing the first encrypted tunnel between the mobile entry node and the first active N2 interface security gateway; and engaging, by the mobile network entry node in conjunction with the second active N2 interface security gateway at the second data center, in the encryption key management protocol for establishing the third encrypted tunnel between the mobile entry node and the second active N2 interface security gateway.

4. The method of claim 3, wherein the encryption key management protocol comprises Internet Key Exchange (IKE) and wherein the encryption protocol comprises Internet Protocol Security (IPSec).

5. The method of claim 3, wherein engaging, by the mobile network entry node in conjunction with the first active N2 interface security gateway, in the encryption key management protocol results in obtaining one or more first encryption keys, wherein establishing the first encrypted tunnel with the first active N2 interface security gateway further comprises using an encryption protocol and the one or more first encryption keys to establish the first encrypted tunnel between the mobile network entry node and the first active N2 interface security gateway, wherein engaging, by the mobile network entry node in conjunction with the second active N2 interface security gateway, in the encryption key management protocol results in obtaining one or more third encryption keys, and wherein establishing the third encrypted tunnel with the second active N2 interface security gateway at the second data center further comprises using the encryption protocol and the one or more third encryption keys to establish the third encrypted tunnel between the mobile network entry node and the second active N2 interface security gateway at the second data center.

6. The method of claim 1, further comprising:

installing, prior to establishing the first encrypted tunnel, the first AMF and the first active N2 interface security gateway at the first data center; and installing, prior to establishing the first encrypted tunnel, the second AMF, the standby N2 interface security gateway, and the second active N2 interface security gateway at the second data center.

7. The method of claim 1, wherein the first data center is located at a first data center site and the second data center is located at a second data center site, wherein the first data center site comprises a first geographic location and the second data center site comprises a second geographic location, and wherein the first geographic location is located in geographic proximity to the second geographic location.

8. The method of claim 1, wherein the mobile network comprises a Fifth Generation (5G) mobile network.

9. A device, comprising:

at least one transceiver configured to communicate via a mobile core network; and at least one hardware processor, microprocessor, or processing logic configured to:

establish a first encrypted tunnel with a first active N2 interface security gateway at a first data center to enable the device to communicate, via the first encrypted tunnel and the first active N2 interface security gateway, with a first access and mobility management function (AMF), paired with the first active N2 interface security gateway, at the first data center, wherein the device comprises a device in a Radio Access Network (RAN), a device associated with a femtocell connected to a mobile network, or a device executing an Interworking Function (IWF) that enables interworking between one or more other networks and the mobile network, determine an occurrence of a failure or overload condition at the first active N2 interface security gateway at the first data center, establish, based on the determined occurrence of the failure or overload condition at the first active N2 interface security gateway, a second encrypted tunnel with a standby N2 interface security gateway at a second data center to temporarily pair the standby N2 interface security gateway at the second data center with the first AMF at the first data center and enable the device to communicate, via the second encrypted tunnel, the N2 interface, and the standby N2 interface security gateway, with the first AMF at the first data center, initiate, based on the determined occurrence of the failure or overload condition at the first active N2 interface security gateway, AMF relocation from the first AMF at the first data center to a second AMF at the second data center, and initiate, in coordination with the AMF relocation, security gateway relocation from the standby N2 interface security gateway at the second data center to a second active N2 interface security gateway at the second data center to pair the second active N2 interface security gateway with the second AMF at the second data center.

10. The device of claim 9, wherein the at least one hardware processor, microprocessor, or processing logic is further configured to:

establish, based on the coordinated AMF relocation and security gateway relocation, a third encrypted tunnel with the second active N2 interface security gateway to enable the device to communicate, via the third encrypted tunnel, the N2 interface, and the second active N2 interface security gateway, with the paired second AMF at the second data center, and forward, via the third encrypted tunnel, the N2 interface, and the second active N2 interface security gateway, at least one UE message to the second AMF at the second data center.

11. The device of claim 10, wherein the at least one hardware processor, microprocessor, or processing logic is further configured to:

engage, in conjunction with the first active N2 interface security gateway paired with the first AMF at the first data center, in an encryption key management protocol for establishing the first encrypted tunnel between the device and the first active N2 interface security gateway, and engage, in conjunction with the second active N2 interface security gateway at the second data center, in the encryption key management protocol for establishing the third encrypted tunnel between the device and the second active N2 interface security gateway.

12. The device of claim 11, wherein the encryption key management protocol comprises Internet Key Exchange (IKE) and wherein the encryption protocol comprises Internet Protocol Security (IPSec).

13. The device of claim 11, wherein engaging, in conjunction with the first active N2 interface security gateway, in the encryption key management protocol results in obtaining one or more first encryption keys, wherein, when establishing the first encrypted tunnel with the first active N2 interface security gateway, the hardware processor, microprocessor, or processing logic is further configured to use an encryption protocol and the one or more first encryption keys to establish the first encrypted tunnel between the device and the first active N2 interface security gateway, wherein engaging, in conjunction with the second active N2 interface security gateway, in the encryption key management protocol results in obtaining one or more third encryption keys, and wherein, when establishing the third encrypted tunnel with the second active N2 interface security gateway at the second data center, the at least one hardware processor, microprocessor, or processing logic is further configured to use the encryption protocol and the one or more third encryption keys to establish the third encrypted tunnel between the device and the second active N2 interface security gateway at the second data center.

14. The device of claim 9, wherein the mobile network comprises a Fifth Generation (5G) mobile network.

15. The device of claim 9, wherein the first data center is located at a first data center site and the second data center is located at a second data center site, wherein the first data center site comprises a first geographic location and the second data center site comprises a second geographic location, and wherein the first geographic location is located in geographic proximity to the second geographic location.

16. A non-transitory storage medium storing instructions executable by a network device, wherein the instructions cause the network device to:

establish a first encrypted tunnel with a first active N2 interface security gateway at a first data center to enable the network device to communicate, via the first encrypted tunnel and the first active N2 interface security gateway, with a first access and mobility management function (AMF), paired with the first active N2 interface security gateway, at the first data center, wherein the network device comprises a device in a Radio Access Network (RAN), a device associated with a femtocell connected to a mobile network, or an Interworking Function (IWF) that enables interworking between one or more other networks and the mobile network;

determine an occurrence of a failure or overload condition at the first active N2 interface security gateway at the first data center;

establish, based on the determined occurrence of the failure or overload condition at the first active N2 interface security gateway, a second encrypted tunnel with a standby N2 interface security gateway at a second data center to temporarily pair the standby N2 interface security gateway at the second data center with the first AMF at the first data center and enable the network device to communicate, via the second encrypted tunnel, the N2 interface, and the standby N2 interface security gateway, with the first AMF at the first data center;

initiate, based on the determined occurrence of the failure or overload condition at the first active N2 interface security gateway, AMF relocation from the first AMF at the first data center to a second AMF at the second data center; and initiate, in coordination with the AMF relocation, security gateway relocation from the standby N2 interface security gateway at the second data center to a second active N2 interface security gateway at the second data center to pair the second active N2 interface security gateway with the second AMF at the second data center.

17. The non-transitory storage medium of claim 16, wherein the instructions further cause the network device to:

establish, based on the coordinated AMF relocation and security gateway relocation, a third encrypted tunnel with the second active security gateway to enable the network device to communicate, via the third encrypted tunnel, the N2 interface, and the second active N2 interface security gateway, with the paired second AMF at the second data center; and forward, via the third encrypted tunnel, the N2 interface, and the second active N2 interface security gateway at the second data center, at least one UE message to the second AMF at the second data center.

18. The non-transitory storage medium of claim 17, wherein the instructions further cause the network device to:

engage, in conjunction with the first active N2 interface security gateway paired with the first AMF at the first data center, in an encryption key management protocol for establishing the first encrypted tunnel between the network device and the first active N2 interface security gateway; and engage, in conjunction with the second active N2 interface security gateway at the second data center, in the encryption key management protocol for establishing the third encrypted tunnel between the network device and the second active N2 interface security gateway.

19. The non-transitory storage medium of claim 18, wherein engaging, in conjunction with the first active N2 interface security gateway, in the encryption key management protocol results in obtaining one or more first encryption keys, wherein the instructions to cause the network device to establish the first encrypted tunnel with the first active N2 interface security gateway further cause the network device to use an encryption protocol and the one or more first encryption keys to establish the first encrypted tunnel between the network device and the first active N2 interface security gateway, wherein engaging, in conjunction with the second active N2 interface security gateway, in the encryption key management protocol results in obtaining one or more third encryption keys, and wherein the instructions to cause the network device to establish the third encrypted tunnel with the second active N2 interface security gateway at the second data center further cause the network device to use the encryption protocol and the one or more third encryption keys to establish the third encrypted tunnel between the network device and the second active N2 interface security gateway at the second data center.

20. The non-transitory storage medium of claim 16, wherein the mobile network comprises a Fifth Generation (5G) mobile network.

21. The non-transitory storage medium of claim 16, wherein the first data center is located at a first data center site and the second data center is located at a second data center site, wherein the first data center site comprises a first geographic location and the second data center site comprises a second geographic location, and wherein the first geographic location is located in geographic proximity to the second geographic location.

* * * * *